United States Patent Office 3,294,807
Patented Dec. 27, 1966

3,294,807
PROCESS FOR PREPARING 3,5-DISUBSTITUTED ISOXAZOLE COMPOUNDS
Hideo Kano, Kyoto-shi, Kyoto, Ikuo Adachi, Toyonaka-shi, Osaka, Ryonosuke Kido, Ikeda-shi, Osaka, and Katsumi Hirose, Nishinomiya-shi, Hyogo, Japan, assignors to Shionogi & Co., Ltd., Doshomachi, Hagashi-ku, Osaka-shi, Japan
No Drawing. Filed Dec. 2, 1963, Ser. No. 327,551
6 Claims. (Cl. 260—294.7)

The present invention relates to a process for preparing 3,5-disubstituted isoxazole compounds. More particularly, it relates to a process for preparing 3,5-disubstituted isoxazole compounds represented by the formula:

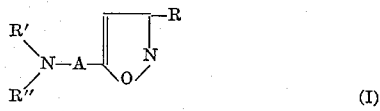
(I)

wherein R is a pyridyl group, R' and R" each is a hydrogen atom or a lower alkyl group (e.g. methyl, ethyl, propyl, butyl) or R' and R" represent together a tetramethylene, pentamethylene, hexamethylene, oxatetramethylene, oxapentamethylene, oxahexamethylene, azatetramethylene, azapentamethylene, azahexamethylene, thiatetramethylene, thiapentamethylene or thiahexamethylene chain, and A is a lower alkylene group (e.g. methylene, ethylene, propylene, isopropylene, butylene, isobutylene).

The objective isoxazole compound (I) can be prepared by reaction between an aminoalkyne represented by the formula:

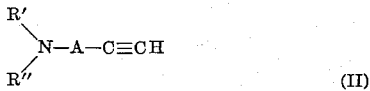
(II)

wherein R', R" and A each has the same significance as designated above and a nitrile oxide represented by the formula:

$$O \leftarrow \equiv C - R \qquad (III)$$

wherein R has the same significance as designated above.

The one starting material of the present invention, namely the aminoalkyne (II), is prepared by a per se conventional procedure, i.e. reaction of an aminoalkyl halide represented by the formula:

wherein X is a halogen atom (e.g. chlorine, bromine) and R', R" and A each has the same significance as designated above, with an alkali metal acetylide (Campbell et al.: J. Org. Chem., vol 17, p. 1141 (1952); Epsztein et al.: Bull. Soc. Chim. France, p. 952 (1953)). The other starting material of the present invention, namely the nitrile oxide (III), is prepared from the corresponding aldoxime according to the following scheme:

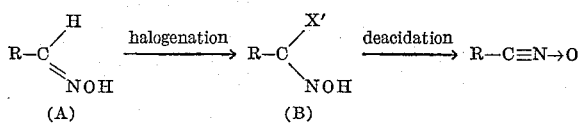

wherein X' is a halogen atom (e.g. chlorine, bromine) and R has the same significance as designated above.

According to the process of the present invention, the reaction between the aminoalkyne (II) and the nitrile oxide (III) is carried out in an inert solvent at a wide range of temperature from about 20° C. (room temperature) to reflux temperature. As the inert solvent, there are exemplified alkanols (e.g. methanol, ethanol), halogenalkenes (e.g. chloroform, carbon tetrachloride), benzene, toluene, xylene, ether, tetrahydrofuran and dioxane. Of these solvents, the use of a non polar solvent such as benzene, ether and tetrahydrofuran is preferred. The nitrile oxide (III) is considerably unstable and must be used while fresh. Accordingly, the process is actually carried out, for instance, by adding the aminoalkyne (II) to the reaction mixture of the hydroxamyl halide (B) with a basic substance in the said inert solvent in which the produced nitrile oxide (III) is present. In the alternative, the process can be advantageously executed, for example, by adding a basic substance to a previously prepared mixture of the aminoalkyne (II) and the hydroxamyl halide (B) in the said inert solvent whereby the produced nitrile oxide (III) is instantly reacted with the aminoalkyne (II). Examples of the basic substance employed as the acid eliminating agent in those operations are alkali metal hydroxides or alkaline earth metal hydroxides (e.g. sodium hydroxide, potassium hydroxide, calcium hydroxide), alkali metal salts or alkaline earth metal salts of inorganic or organic weak acids (e.g. sodium carbonate, potassium carbonate, sodium bicarbonate, sodium acetate), ammonia and amines (e.g. dimethylamine, triethylamine, pyridine, picoline, dimethylaniline). In place of the said basic substance, the aminoalkyne (II) per se may be used as the acid eliminating agent.

The thus prepared isoxazole compounds (I) are liquid or solid or solid in the free state. For convenience on preparation, they may be converted into their acid addition salts or quaternary salts, for instance, by treating the base with an acid such as hydrochloric, hydrobromic, hydroiodic, sulfuric, oxalic, citric, tartaric, succinic, salicylic, benzoic or palmitic acid or with a quaternizing agent such as methyl chloride, ethyl chloride, ethyl bromide, methyl iodide, ethyl iodide, phenethyl bromide, benzenesulfonyl bromide or p-toluenesulfonyl bromide in a suitable solvent such as water, methanol, ethanol, ether, benzene and toluene. There are thus produced the corresponding hydrochloride, hydrobromide, hydroiodide, sulfate, nitrate, phosphate, thiocyanate, carbonate, acetate, propionate, oxalate, citrate, tartrate, succinate, salicylate, zenzoate or palmitate, or the corresponding methyl ammonium chloride, ethyl ammonium chloride, ethyl ammonium bromide, methyl ammoniun iodide, ethyl ammonium iodide, phenethyl ammoniun bromide, benzenesulfonyl ammonium chloride benzene-sulfonyl ammonium bromide, or p-toluenesulfonyl ammonium bromide.

The isoxazole compounds (I) and non-toxic salts thereof are useful as antipyretic, analgesic, antitussive and antiinflammatory agents. They can be administered in a variety of per se conventional ways, e.g. in the form of tablets constituted e.g. by an effective single dose of active compound of the invention and a major proportion of a per se conventional carrier.

The following examples represent presently-preferred embodiments of the present invention, but it is to be understood that these are given by way of illustration only and not of limitation. Parts by weight bear the same relation to parts by volume as do grams to milliliters.

*Example 1*

Into a solution of 2-pyridylaldoxime (7.2 parts by weight) in chloroform (180 parts by volume), there is introduced chlorine gas (12.0 parts by weight) in 15 minutes while stirring at −20 to −15° C. and the resultant mixture is stirred for 1 hour at around 0° C. The reaction mixture is evaporated under reduced pressure, and the residue is crystallized from a mixture of ethanol and ether to give 2-pyridylhydroxamyl chloride hydrochloride (11.1 parts by weight) as colorless needles melting at 147 to 150° C.

To a solution of 4-dimethylamino-1-butyne (1.9 parts by weight) and triethylamine (3.0 parts by weight) in ethanol (15 parts by volume), there is added dropwise 2-pyridylhydroxamyl chloride hydrochloride (1.95 parts by weight) at 10 to 12° C. while stirring, and the resultant mixture is stirred for 2 hours at 60 to 65° C. The reaction mixture is concentrated under reduced pressure, combined with a small amount of water and shaken with chloroform. The chloroform layer is dried over anhydrous potassium carbonate, treated with activated carbon and the solvent removed by distillation under reduced pressure. The resulting liquid is combined with petroleum ether and allowed to stand to separate crystals. After separation of the crystals by filtration, the filtrate is concentrated and then distilled under reduced pressure to give 3 - (2 - pyridyl)-5-(2-dimethylaminoethyl)-isoxazole (1.8 parts by weight) as a pale yellowish oil boiling at 127° C./2 mm. Hg. The citrate forms colorless prisms melting at 110 to 111° C., when crystallized from ethanol.

Example 2

Into a solution of 3-pyridylaldoxime (7.2 parts by weight) in chloroform (180 parts by volume), there is introduced chlorine gas (12.0 parts by weight) in 15 minutes while stirring at −20 to −15° C., and the resultant mixture is stirred for 1 hour at around 0° C. The reaction mixture is evaporated under reduced pressure, and the residue is crystallized from a mixture of ethanol and ether to give 3-pyridylhydroxamyl chloride hydrochloride (10.65 parts by weight) as colorless needles melting at 156 to 159° C.

To a solution of 4-diethylamino-1-butyne (2.5 parts by weight) and triethylamine (3.0 parts by weight) in ethanol (15 parts by volume), there is added dropwise 3-pyridylhydroxamyl chloride hydrochloride (1.95 parts by weight) at 10 to 15° C. while stirring, and the resultant mixture is concentrated under reduced pressure, combined with a small amount of water and shaken with chloroform. The chloroform layer is dried over anhydrous potassium carbonate, treated with activated carbon and the solvent removed by evaporation under reduced pressure. The resulting liquid is distilled under reduced pressure to give 3-(3-pyridyl)-5 - (2 - diethylaminoethyl) - isoxazole (0.75 part by weight) as a pale yellowish oil boiling at 159° C./3 mm. Hg. The citrate forms colorless needless melting at 151 to 152° C., when crystallized from methanol.

In similar manner, there are produced other isoxazole compounds and their salts. Some examples of these are as follows: 3-(2-pyridyl)-5-(2 - diethylaminoethyl)-isoxazole, B.P. 127° C./1 mm. Hg; 3-(2-pyridyl)-5-(2-diethylaminoethyl)-isoxazole citrate, M.P. 150 to 151° C.; 3-(2-pyridyl)-5-(2-piperidinoethyl)-isoxazole, B.P. 153° C./1 mm. Hg; 3-(2-pyridyl)-5-(2-piperidinoethyl)-isoxazole hydrochloride, M.P. 218 to 219° C.

What is claimed is:
1. An isoxazole of the formula:

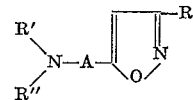

wherein R is pyridyl, R' and R'' each is a member selected from the group consisting of hydrogen and lower alkyl and R' and R'' together represent a member selected from the group consisting of tetramethylene, pentamethylene and hexamethylene, and A is lower alkylene.

2. 3-(pyridyl) - 5 - di(lower)amino(lower)alkyl-isoxazole, the pyridyl being a member selected from the group consisting of 2-pyridyl and 3-pyridyl.

3. 3-(2-pyridyl)-5-(2-dimethylaminoethyl)-isoxazole.
4. 3-(2-pyridyl)-5-(2-diethylaminoethyl)isoxazole.
5. 3-(2-pyridyl)-5-(2-piperidinoethyl)-isoxazole.
6. 3-(3-pyridyl)-5-(2-diethylaminoethyl)-isoxazole.

No references cited.

WALTER A. MODANCE, *Primary Examiner.*

AVROM D. SPEVACK, *Assistant Examiner.*